Figure 1:
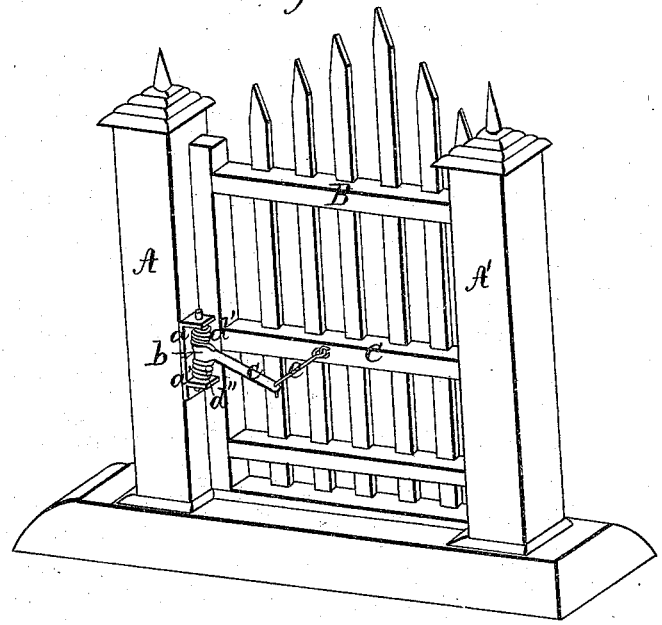
Figure 2:
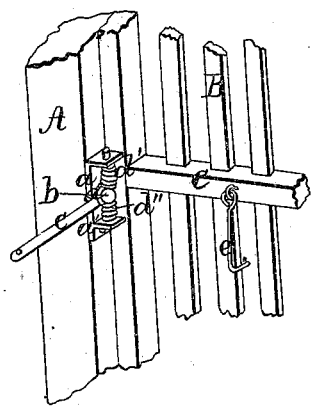

W. Leonard.
Gate.

No. 94,900.  Patented Sept. 14, 1869.

Witnesses;
Sydney E. Smith
A. M. Stout Jr.

Inventor;
William Leonard
Per Geo. Burgess &c. Attys.

United States Patent Office.

WILLIAM LEONARD, OF ORLEANS, INDIANA.

Letters Patent No. 94,900, dated September 14, 1869.

IMPROVEMENT IN GATES.

The Schedule referred to in these Letters Patent and making part of the same.

*To all whom it may concern:*

Be it known that I, WILLIAM LEONARD, of Orleans, in the county of Orange, and State of Indiana, have invented a new and useful Improvement in Gates; and I do hereby declare the following to be a full and correct description of the same, sufficient to enable others skilled in the art to which my invention appertains, to fully understand and construct the same, reference being had to the accompanying drawings, which make part of this specification, and in which—

Figure I is a perspective view of my improvement, when the spring is attached to the gate, and Figure II is a similar view, with the spring detached from the gate.

Like letters of reference indicate like parts in the two figures.

The nature of my invention consists in the peculiar construction and attachment to a gate of a spring, in such a manner that the gate can be made self-closing, or not, at pleasure.

A A', in the drawings, represent the gate-posts, between which the gate B swings, being hinged to post A.

To this post A are securely fastened two lugs $a\ a'$, which form the bearing of a short rotating post or arm, $b$, on the centre of which, at right angles with it, and parallel with the cross-piece C of the gate B, is formed an arm or lever, $c$, around the post $b$.

Between the lugs $a\ a'$ is a coiled spring, $d$, passing around the lever $c$, in such a manner as to force the lever $c$ away inwardly from the gate B.

The lever $c$ is connected with the gate B by a hook, $e$, which is secured to the cross-piece C by means of a staple.

It will be seen that when the gate B is opened, the lever $c$, being pulled in the same direction with the gate by the hook $e$, will act against the spring $d$, so that the gate, on being released, will be forced to the original position, by means of the spring $d$ acting on the lever $c$.

The spring $d$ consists of two parts $d'\ d''$, the former being around that part of the post $b$ which is above the lever $c$, then passing around the latter, and as $d''$ in opposite direction, around the part of post $b$, which is below the lever $c$.

Thus both parts $d'\ d''$ of the spring $e$ operate on the lever $c$ in the same direction.

This gate can thus be used either with or without the spring, by either attaching to the lever $c$, or detaching from it the hook $e$.

Having thus described my invention,

What I claim as new therein, and desire to secure by Letters Patent, is—

The shaft $b$, arm $c$, spring $d$, and hook $e$, in combination with gate C and post A, arranged as herein described.

WILLIAM LEONARD.

Witnesses:
WILBUR VAN FOSSEN,
DAVID M. HUDELSON.